US012588034B2

(12) United States Patent  
Xiao et al.

(10) Patent No.: US 12,588,034 B2  
(45) Date of Patent: Mar. 24, 2026

(54) METHODS AND APPARATUSES FOR PUSCH REPETITION TRANSMISSIONS

(71) Applicant: Lenovo (Beijing) Limited, Beijing (CN)

(72) Inventors: Lingling Xiao, Beijing (CN); Bingchao Liu, Beijing (CN); Chenxi Zhu, Beijing (CN); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 316 days.

(21) Appl. No.: 18/580,083

(22) PCT Filed: Sep. 30, 2021

(86) PCT No.: PCT/CN2021/122248  
§ 371 (c)(1),  
(2) Date: Jan. 17, 2024

(87) PCT Pub. No.: WO2023/050343  
PCT Pub. Date: Apr. 6, 2023

(65) Prior Publication Data  
US 2025/0089062 A1 Mar. 13, 2025

(51) Int. Cl.  
*H04W 72/231* (2023.01)  
*H04L 5/00* (2006.01)  
*H04W 72/1268* (2023.01)

(52) U.S. Cl.  
CPC ......... *H04W 72/231* (2023.01); *H04L 5/0051* (2013.01); *H04W 72/1268* (2013.01)

(58) Field of Classification Search  
CPC . H04W 72/23; H04W 72/231; H04W 72/232; H04W 72/1268; H04L 5/0051;  
(Continued)

(56) References Cited

U.S. PATENT DOCUMENTS

| | | | | |
|---|---|---|---|---|
| 12,369,169 B2 * | 7/2025 | Mei | ........................... | H04L 1/08 |
| 2020/0228280 A1 * | 7/2020 | Yang | ..................... | H04L 5/0051 |

(Continued)

FOREIGN PATENT DOCUMENTS

| | | |
|---|---|---|
| CN | 108886448 A | 11/2018 |
| CN | 112106315 A | 12/2020 |

(Continued)

OTHER PUBLICATIONS

PCT/CN2021/122248 , "International Search Report and Written Opinion", PCT Application No. PCT/CN2021/122248, Apr. 25, 2022, 6 pages.

(Continued)

*Primary Examiner* — Brian T Le

(74) *Attorney, Agent, or Firm* — FIG. 1 Patents

(57) ABSTRACT

The present disclosure relates to methods and apparatuses for physical uplink shared channel (PUSCH) repetition transmissions. One embodiment of the present application provides a user equipment (UE), including: a receiver that receives downlink control information (DCI) including a first indicator and a second indicator; and a processor that is coupled with the receiver. The first indicator includes a first bit and a second bit and indicates one or two phase tracking reference signal (PTRS)-demodulation reference signal (DMRS) associations between PTRS port(s) and DMRS port(s). The second indicator indicates whether a set of PUSCH repetition transmissions is transmitted according to sounding reference signal (SRS) resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set. The processor determines a mapping relationship between the (Continued)

PTRS-DMRS association indicated by the first bit and/or the second bit of the first indicator and each PUSCH repetition transmission among the set of PUSCH repetition transmissions based on the first indicator and the second indicator.

20 Claims, 4 Drawing Sheets

(58) Field of Classification Search
  CPC ... H04L 5/0048; H04L 5/0053; H04L 5/0091;
          H04L 1/08; H04L 1/1858; H04L 1/189
  See application file for complete search history.

(56) References Cited

U.S. PATENT DOCUMENTS

| | | | |
|---|---|---|---|
| 2020/0413433 A1 * | 12/2020 | Jiang ..................... | H04L 1/0072 |
| 2021/0112586 A1 | 4/2021 | Bhamri et al. | |

FOREIGN PATENT DOCUMENTS

| | | |
|---|---|---|
| CN | 112136288 A | 12/2020 |
| CN | 113228547 A | 8/2021 |

OTHER PUBLICATIONS

VIVO , "Further discussion on Multi-TRP for PDCCH, PUCCH and PUSCH enhancements", 3GPP TSG RAN WG1 #106-e, R1-2106572, e-Meeting, Aug. 2021, 28 pages.

* cited by examiner

PUSCH mode field being "10"

PUSCH mode field being "11"

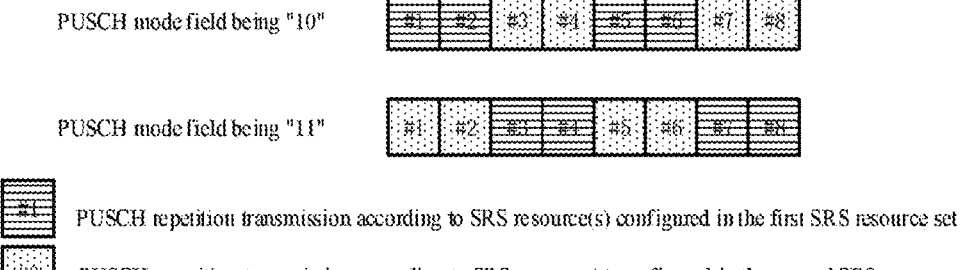

PUSCH repetition transmission according to SRS resource(s) configured in the first SRS resource set PUSCH repetition transmission according to SRS resource(s) configured in the second SRS resource set

Fig. 2A

PUSCH mode field being "10"

PUSCH mode field being "11"

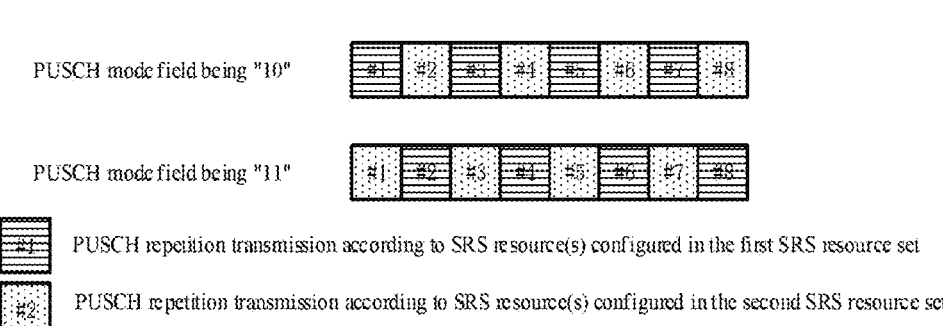

PUSCH repetition transmission according to SRS resource(s) configured in the first SRS resource set PUSCH repetition transmission according to SRS resource(s) configured in the second SRS resource set

Fig. 2B receiving DCI including a first indicator and a second indicator — 301 determining a mapping relationship between the PTRS-DMRS association indicated by a first bit and/or a second bit of the first indicator and each PUSCH repetition transmission among a set of PUSCH repetition transmissions based on the first indicator and the second indicator — 302 determining a mapping relationship between one or two PTRS-DMRS associations and each PUSCH repetition transmission among a set of PUSCH repetition transmissions and generating a first indicator and a second indicator    401 transmitting DCI including the first indicator and the second indicator    402

500 transmitter receiver processor

METHODS AND APPARATUSES FOR PUSCH REPETITION TRANSMISSIONS

TECHNICAL FIELD

Embodiments of the present application generally relate to wireless communication technology, and in particular to methods and apparatuses for physical uplink shared channel (PUSCH) repetition transmissions.

BACKGROUND

Multiple transmit-receive point (M-TRP) based transmission has been introduced into New Radio (NR). In NR Rel-17, it is proposed to identify and specify features to improve reliability and robustness for channels besides a physical downlink shared channel (PDSCH), e.g., physical downlink control channel (PDCCH), PUSCH, and physical uplink control channel (PUCCH), using multiple transmit-receive points (TRPs) and/or multiple panels, with Rel-17 reliability features.

It was agreed that two sounding reference signal (SRS) resource sets can be configured for codebook based PUSCH repetition transmission or for non-codebook based PUSCH repetition transmission, where one SRS resource set is used for the PUSCH repetition transmission toward one TRP. For single downlink control information (DCI) based M-TRP PUSCH Type B repetition schemes with a maximum number of layers of a PUSCH repetition transmission being 2, the phase tracking reference signal (PTRS)-demodulation reference signal (DMRS) association field in DCI format 0_1 or DCI format 0_2 is 2 bits, wherein the most significant bit (MSB) and the least significant bit (LSB) indicate associations between PTRS port(s) and DMRS port(s) for two TRPs respectively. When a user equipment (UE) performs M-TRP based PUSCH repetition transmission, it needs to know whether the association between PTRS port(s) and DMRS port(s) indicated by the MSB or the LSB of the PTRS-DMRS association field should be used for the PUSCH repetition transmission to a TRP of the multiple TRPs.

In addition, how to interpret the PTRS-DMRS association field for single TRP (S-TRP) based PUSCH repetition transmission or for a case that different actual numbers of PTRS ports are indicated for PUSCH repetition transmissions toward different TRPs is also an important issue to be resolved.

SUMMARY OF THE APPLICATION

According to some embodiments of the present application, a UE includes: a receiver that receives DCI including a first indicator and a second indicator, wherein the first indicator includes a first bit and a second bit and indicates one or two PTRS-DMRS associations between PTRS port(s) and DMRS port(s), and wherein the second indicator indicates whether a set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set; and a processor that is coupled with the receiver and determines a mapping relationship between the PTRS-DMRS association indicated by the first bit and/or the second bit of the first indicator and each PUSCH repetition transmission among the set of PUSCH repetition transmissions based on the first indicator and the second indicator.

In some embodiments, the second indicator indicates that the set of PUSCH repetition transmissions is transmitted according to SRS resource(s) configured in both the first SRS resource set and the second SRS resource set.

In an embodiment, the processor determines that a first PTRS-DMRS association indicated by the first bit is used for PUSCH repetition transmission(s) according to SRS resource(s) configured in the first SRS resource set, and a second PTRS-DMRS association indicated by the second bit is used for PUSCH repetition transmission(s) according to SRS resource(s) configured in the second SRS resource set.

In an embodiment, the processor determines that a first PTRS-DMRS association indicated by the first bit is used for PUSCH repetition transmission(s) according to SRS resource(s) configured in an SRS resource set according to which a first one of the set of PUSCH repetition transmissions is transmitted, and a second PTRS-DMRS association indicated by the second bit is used for other PUSCH repetition transmission(s) of the set of PUSCH repetition transmissions.

In an embodiment, the processor determines that a first PTRS-DMRS association indicated by the first bit is used for PUSCH repetition transmission(s) according to SRS resource(s) configured in an SRS resource set indicated by a first SRS resource indicator (SRI) field in the DCI, and a second PTRS-DMRS association indicated by the second bit is used for PUSCH repetition transmission(s) according to SRS resource(s) configured in an SRS resource set indicated by a second SRI field in the DCI.

In an embodiment, a first total number of PTRS ports indicated for PUSCH repetition transmission(s) according to SRS resource(s) configured in the first SRS resource set is different from a second total number of PTRS ports indicated for PUSCH repetition transmission(s) according to SRS resource(s) configured in the second SRS resource set.

In an embodiment, the processor determines a first PTRS-DMRS association between PTRS port(s) and DMRS port(s) for PUSCH repetition transmission(s) according to SRS resource(s) configured in the first SRS resource set based on at least one of the first bit and the second bit according to a first association table, and determines a second PTRS-DMRS association between PTRS port(s) and DMRS port(s) for PUSCH repetition transmission(s) according to SRS resource(s) configured in the second SRS resource set based on at least one of the first bit and the second bit according to a second association table different from the first association table.

In some embodiments, the second indicator indicates that the set of PUSCH repetition transmissions is transmitted according to SRS resource(s) configured in one SRS resource set of the first SRS resource set and the second SRS resource set.

In an embodiment, each of the first bit and the second bit corresponds to a respective SRS resource set of the first SRS resource set and the second SRS resource set, and the processor determines one bit of the first bit and the second bit which corresponds to the one SRS resource set to indicate a PTRS-DMRS association between PTRS port(s) and DMRS port(s) for each of the set of PUSCH repetition transmissions and ignores the other bit of the first bit and second bit.

In an embodiment, the processor determines the first indicator including both the first bit and the second bit to indicate a PTRS-DMRS association between PTRS port(s) and DMRS port(s) for each of the set of PUSCH repetition transmissions.

According to some embodiments of the present application, a base station (BS) includes: a processor that determines a mapping relationship between one or two PTRS-DMRS associations and each PUSCH repetition transmission among a set of PUSCH repetition transmissions and generates a first indicator and a second indicator, wherein the first indicator includes a first bit and a second bit and indicates the one or two PTRS-DMRS associations between PTRS port(s) and DMRS port(s), and wherein the second indicator indicates whether the set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set; and a transmitter that is coupled with the processor and transmits DCI including the first indicator and the second indicator.

In some embodiments, the second indicator indicates that the set of PUSCH repetition transmissions is transmitted according to SRS resource(s) configured in both the first SRS resource set and the second SRS resource set.

In an embodiment, the processor determines that a first PTRS-DMRS association indicated by the first bit is used for PUSCH repetition transmission(s) according to SRS resource(s) configured in the first SRS resource set, and a second PTRS-DMRS association indicated by the second bit is used for PUSCH repetition transmission(s) according to SRS resource(s) configured in the second SRS resource set.

In an embodiment, the processor determines that a first PTRS-DMRS association indicated by the first bit is used for PUSCH repetition transmission(s) according to SRS resource(s) configured in an SRS resource set according to which a first one of the set of PUSCH repetition transmissions is transmitted, and a second PTRS-DMRS association indicated by the second bit is used for other PUSCH repetition transmission(s) of the set of PUSCH repetition transmissions.

In an embodiment, the processor determines that a first PTRS-DMRS association indicated by the first bit is used for PUSCH repetition transmission(s) according to SRS resource(s) configured in an SRS resource set indicated by a first SRI field in the DCI, and a second PTRS-DMRS association indicated by the second bit is used for PUSCH repetition transmission(s) according to SRS resource(s) configured in an SRS resource set indicated by a second SRI field in the DCI.

In an embodiment, a first total number of PTRS ports indicated for PUSCH repetition transmission(s) according to SRS resource(s) configured in the first SRS resource set is different from a second total number of PTRS ports indicated for PUSCH repetition transmission(s) according to SRS resource(s) configured in the second SRS resource set.

In an embodiment, the processor determines a first PTRS-DMRS association between PTRS port(s) and DMRS port(s) for PUSCH repetition transmission(s) according to SRS resource(s) configured in the first SRS resource set based on at least one of the first bit and the second bit according to a first association table, and determines a second PTRS-DMRS association between PTRS port(s) and DMRS port(s) for PUSCH repetition transmission(s) according to SRS resource(s) configured in the second SRS resource set based on at least one of the first bit and the second bit according to a second association table different from the first association table.

In some embodiments, the second indicator indicates that the set of PUSCH repetition transmissions is transmitted according to SRS resource(s) configured in one SRS resource set of the first SRS resource set and the second SRS resource set.

In an embodiment, each of the first bit and the second bit corresponds to a respective SRS resource set of the first SRS resource set and the second SRS resource set, and the processor determines one bit of the first bit and the second bit which corresponds to the one SRS resource set to indicate a PTRS-DMRS association between PTRS port(s) and DMRS port(s) for each of the set of PUSCH repetition transmissions and ignores the other bit of the first bit and second bit.

In an embodiment, the processor determines the first indicator including both the first bit and the second bit to indicate a PTRS-DMRS association between PTRS port(s) and DMRS port(s) for each of the set of PUSCH repetition transmissions.

According to some embodiments of the present application, a method performed by a UE includes: receiving DCI including a first indicator and a second indicator, wherein the first indicator includes a first bit and a second bit and indicates one or two PTRS-DMRS associations between PTRS port(s) and DMRS port(s), and wherein the second indicator indicates whether a set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set; and determining a mapping relationship between the PTRS-DMRS association indicated by the first bit and/or the second bit of the first indicator and each PUSCH repetition transmission among the set of PUSCH repetition transmissions based on the first indicator and the second indicator.

In some embodiments, the second indicator indicates that the set of PUSCH repetition transmissions is transmitted according to SRS resource(s) configured in both the first SRS resource set and the second SRS resource set.

In an embodiment, the method includes determining that a first PTRS-DMRS association indicated by the first bit is used for PUSCH repetition transmission(s) according to SRS resource(s) configured in the first SRS resource set, and a second PTRS-DMRS association indicated by the second bit is used for PUSCH repetition transmission(s) according to SRS resource(s) configured in the second SRS resource set.

In an embodiment, the method includes determining that a first PTRS-DMRS association indicated by the first bit is used for PUSCH repetition transmission(s) according to SRS resource(s) configured in an SRS resource set according to which a first one of the set of PUSCH repetition transmissions is transmitted, and a second PTRS-DMRS association indicated by the second bit is used for other PUSCH repetition transmission(s) of the set of PUSCH repetition transmissions.

In an embodiment, the method includes determining that a first PTRS-DMRS association indicated by the first bit is used for PUSCH repetition transmission(s) according to SRS resource(s) configured in an SRS resource set indicated by a first SRI field in the DCI, and a second PTRS-DMRS association indicated by the second bit is used for PUSCH repetition transmission(s) according to SRS resource(s) configured in an SRS resource set indicated by a second SRI field in the DCI.

In an embodiment, a first total number of PTRS ports indicated for PUSCH repetition transmission(s) according to SRS resource(s) configured in the first SRS resource set is different from a second total number of PTRS ports indicated for PUSCH repetition transmission(s) according to SRS resource(s) configured in the second SRS resource set.

In an embodiment, the method includes: determining a first PTRS-DMRS association between PTRS port(s) and DMRS port(s) for PUSCH repetition transmission(s) according to SRS resource(s) configured in the first SRS resource set based on at least one of the first bit and the second bit according to a first association table, and determining a second PTRS-DMRS association between PTRS port(s) and DMRS port(s) for PUSCH repetition transmission(s) according to SRS resource(s) configured in the second SRS resource set based on at least one of the first bit and the second bit according to a second association table different from the first association table.

In some embodiments, the second indicator indicates that the set of PUSCH repetition transmissions is transmitted according to SRS resource(s) configured in one SRS resource set of the first SRS resource set and the second SRS resource set.

In an embodiment, each of the first bit and the second bit corresponds to a respective SRS resource set of the first SRS resource set and the second SRS resource set, and the method includes: determining one bit of the first bit and the second bit which corresponds to the one SRS resource set to indicate a PTRS-DMRS association between PTRS port(s) and DMRS port(s) for each of the set of PUSCH repetition transmissions and ignoring the other bit of the first bit and second bit.

In an embodiment, the method includes determining the first indicator including both the first bit and the second bit to indicate a PTRS-DMRS association between PTRS port(s) and DMRS port(s) for each of the set of PUSCH repetition transmissions.

According to some embodiments of the present application, a method performed by a BS includes: determining a mapping relationship between one or two PTRS-DMRS associations and each PUSCH repetition transmission among a set of PUSCH repetition transmissions and generating a first indicator and a second indicator, wherein the first indicator includes a first bit and a second bit and indicates the one or two PTRS-DMRS associations between PTRS port(s) and DMRS port(s), and wherein the second indicator indicates whether the set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set; and transmitting DCI including the first indicator and the second indicator.

In some embodiments, the second indicator indicates that the set of PUSCH repetition transmissions is transmitted according to SRS resource(s) configured in both the first SRS resource set and the second SRS resource set.

In an embodiment, the method includes determining that a first PTRS-DMRS association indicated by the first bit is used for PUSCH repetition transmission(s) according to SRS resource(s) configured in the first SRS resource set, and a second PTRS-DMRS association indicated by the second bit is used for PUSCH repetition transmission(s) according to SRS resource(s) configured in the second SRS resource set.

In an embodiment, the method includes determining that a first PTRS-DMRS association indicated by the first bit is used for PUSCH repetition transmission(s) according to SRS resource(s) configured in an SRS resource set according to which a first one of the set of PUSCH repetition transmissions is transmitted, and a second PTRS-DMRS association indicated by the second bit is used for other PUSCH repetition transmission(s) of the set of PUSCH repetition transmissions.

In an embodiment, the method includes determining that a first PTRS-DMRS association indicated by the first bit is used for PUSCH repetition transmission(s) according to SRS resource(s) configured in an SRS resource set indicated by a first SRI field in the DCI, and a second PTRS-DMRS association indicated by the second bit is used for PUSCH repetition transmission(s) according to SRS resource(s) configured in an SRS resource set indicated by a second SRI field in the DCI.

In an embodiment, a first total number of PTRS ports indicated for PUSCH repetition transmission(s) according to SRS resource(s) configured in the first SRS resource set is different from a second total number of PTRS ports indicated for PUSCH repetition transmission(s) according to SRS resource(s) configured in the second SRS resource set.

In an embodiment, the method includes: determining a first PTRS-DMRS association between PTRS port(s) and DMRS port(s) for PUSCH repetition transmission(s) according to SRS resource(s) configured in the first SRS resource set based on at least one of the first bit and the second bit according to a first association table, and determining a second PTRS-DMRS association between PTRS port(s) and DMRS port(s) for PUSCH repetition transmission(s) according to SRS resource(s) configured in the second SRS resource set based on at least one of the first bit and the second bit according to a second association table different from the first association table.

In some embodiments, the second indicator indicates that the set of PUSCH repetition transmissions is transmitted according to SRS resource(s) configured in one SRS resource set of the first SRS resource set and the second SRS resource set.

In an embodiment, each of the first bit and the second bit corresponds to a respective SRS resource set of the first SRS resource set and the second SRS resource set, and the method includes: determining one bit of the first bit and the second bit which corresponds to the one SRS resource set to indicate a PTRS-DMRS association between PTRS port(s) and DMRS port(s) for each of the set of PUSCH repetition transmissions and ignoring the other bit of the first bit and second bit.

In an embodiment, the method includes determining the first indicator including both the first bit and the second bit to indicate a PTRS-DMRS association between PTRS port(s) and DMRS port(s) for each of the set of PUSCH repetition transmissions.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIGS. 2A and 2B illustrate exemplary PUSCH repetition transmissions towards multiple TRPs based on different values of a PUSCH mode field according to some embodiments of the present disclosure;

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more BSs and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g., on the order of tens of milliseconds, than that of the ideal backhaul link.

In a wireless communication system, one single TRP can be used to serve one or more UEs under control of a BS. In different scenarios, TRP may be called in different terms. Persons skilled in the art should understand that as the 3GPP and the communication technology develop, the terminologies recited in the specification may change, which should not affect the scope of the present application. It should be understood that the TRP(s) (or panel(s)) configured for the BS may be transparent to a UE.

Figure 1:
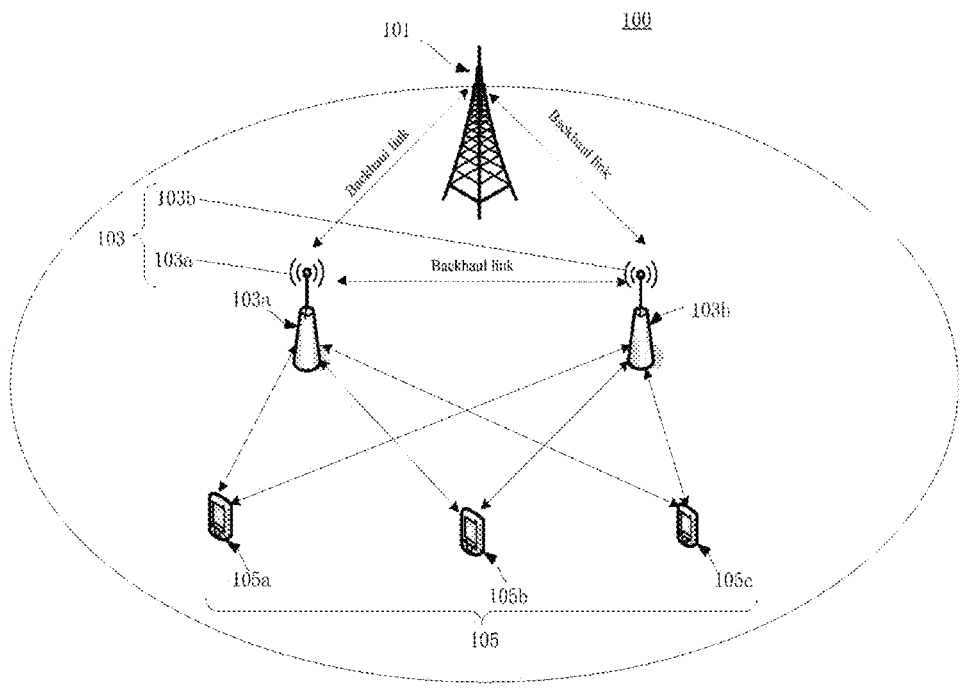
FIG. 1 is a schematic diagram illustrating an exemplary wireless communication system according to some embodiments of the present disclosure.

FIG. 1 is a schematic diagram illustrating an exemplary wireless communication system 100 according to some embodiments of the present application.

Referring to FIG. 1, the wireless communication system 100 can include a BS 101, TRPs 103 (e.g., TRP 103*a* and TRP 103*b*), and UEs 105 (e.g., UE 105*a*, UE 105*b*, and UE 105*c*). Although only one BS 101, two TRPs 103 and three UEs 105 are shown for simplicity, it should be noted that the wireless communication system 100 may include more or less communication device(s), apparatus, or node(s) in accordance with some other embodiments of the present application.

In some embodiments of the present application, the BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the UE 105*a*, the UE 105*b*, and the UE 105*c*) may include, for example, but is not limited to, a computing device, a wearable device, a mobile device, an internet of things (IoT) device, a vehicle, etc.

The TRPs 103, for example, the TRP 103*a* and the TRP 103*b*, can communicate with the BS 101 via, for example, a backhaul link. Each of TRPs 103 can serve some or all of the UEs 105. As shown in FIG. 1, the TRP 103*a* can serve some mobile stations (which include the UE 105*a*, the UE 105*b*, and the UE 105*c*) within a serving area or region (e.g., a cell or a cell sector). The TRP 103*b* can serve some mobile stations (which include the UE 105*a*, the UE 105*b*, and the UE 105*c*) within a serving area or region (e.g., a cell or a cell sector). In some other embodiments, the TRP 103*a* and the TRP 103*b* can serve different UEs. The TRP 103*a* and the TRP 103*b* can communicate with each other via, for example, a backhaul link.

Two SRS resource sets used for codebook (CB) or for non-codebook (nCB) based PUSCH repetition transmission may be configured for a UE to support M-TRP based PUSCH repetition transmission, wherein one SRS resource set is used for at least one PUSCH repetition transmission towards a TRP, and the other SRS resource set is used for at least one PUSCH repetition transmission towards another TRP. Each PUSCH repetition transmission may carry a same transport block (TB) to improve reliability and robustness. The numbers of SRS resources in the two SRS resource sets may be different when different panels are equipped by the UE. Dynamically switching between S-TRP based PUSCH repetition transmission and M-TRP based PUSCH repetition transmission also can be supported.

For example, a DCI (e.g., DCI format 0_1 or DCI format 0_2 as specified in the 3GPP standard documents) may schedule a set of PUSCH repetition transmissions which contains a number of PUSCH transmissions carrying the same TB towards a first TRP (TRP 1) and a second TRP (TRP 2) for a UE. A first SRS resource set and a second SRS resource set are configured for the UE to transmit the set of PUSCH repetition transmissions to different TRPs respectively. The first SRS resource set may refer to the SRS resource set with a lower index (e.g., SRS-ResourceId as specified in 3GPP standard documents), and the second SRS resource set may refer to the SRS resource set with a higher index. Suppose that PUSCH repetition transmission(s) towards TRP 1 is (are) transmitted according to SRS resource(s) in the first SRS resource set, and PUSCH repetition transmission(s) towards TRP 2 is (are) transmitted according to SRS resource(s) in the second SRS resource set. Hereinafter in the present disclosure, the expression "the PUSCH repetition transmission(s) according to SRS resource(s) configured in the first SRS resource set" means "the PUSCH repetition transmission(s) towards the first TRP." and the expression "the PUSCH repetition transmission(s) according to SRS resource(s) configured in the second SRS resource set" means "the PUSCH repetition transmission(s) towards the second TRP."

The DCI may include two SRI fields and two transmission precoding matrix indicator (TPMI) fields (e.g., precoding information and number of layers fields as specified in 3GPP standard documents). Each SRI field may be used to indicate the SRS resource(s) in an SRS resource set used for PUSCH repetition transmission(s). In addition, for non-codebook based PUSCH repetition transmissions, the first SRI field of the two SRI fields (arranged prior to the second SRI field of the two SRI fields in the DCI) may also indicate the number of layers of the PUSCH repetition transmissions towards both TRPs. The TPMI fields are for CB based PUSCH repetition transmissions only, wherein a TPMI field is used for indicating a precoding matrix index from a pre-defined codebook to a UE based on the SRS resource configured in an SRS resource set indicated by an SRI field in the DCI.

According to some embodiments of the present application, the DCI includes a field (or an indicator) for indicating whether the set of PUSCH repetition transmissions is S-TRP based or M-TRP based. In the present disclosure, the field is referred to as "PUSCH mode field." The following Table 1 provides an example of codepoints of a 2-bit PUSCH mode field.

TABLE 1 codepoints of a 2-bit PUSCH mode field

| PUSCH mode Codepoint | SRS resource set(s) | SRI (for both CB and NCB)/TPMI (CB only) field(s) |
|---|---|---|
| 00 | S-TRP mode with first SRS resource set (TRP 1) | first SRI/TPMI field (second SRI/TPMI field is unused) |
| 01 | S-TRP mode with second SRS resource set (TRP 2) | first SRI/TPMI field (second SRI/TPMI field is unused) |
| 10 | M-TRP mode with (TRP 1, TRP 2 order); first SRI/TPMI field: first SRS resource set; second SRI/TPMI field: second SRS resource set | both first and second SRI/TPMI fields |
| 11 | M-TRP mode with (TRP 2, TRP 1 order); first SRI/TPMI field: first SRS resource set; second SRI/TPMI field: second SRS resource set | both first and second SRI/TPMI fields |

Referring to Table 1, the PUSCH mode field being "00" means that:
  The set of PUSCH repetition transmissions is S-TRP based.
  The set of PUSCH repetition transmissions is transmitted according to the SRS resource(s) configured in the first SRS resource set. That is, the set of PUSCH repetition transmissions is transmitted towards the first TRP (i.e., TRP 1).
  The first SRI field is used to indicate the SRS resource(s) configured in the first SRS resource set for the set of PUSCH repetition transmissions, while the second SRI field is not used and can be ignored by the UE. That is, the first SRI field is associated with the first SRS resource set. Also, the first TPMI field is used and associated with the first SRS resource set if the set of PUSCH repetition transmissions is codebook based, while the second TPMI field is not used and can be ignored by the UE.
The PUSCH mode field being "01" means that:
  The set of PUSCH repetition transmissions is S-TRP based.
  The set of PUSCH repetition transmissions is transmitted according to the SRS resource(s) configured in the second SRS resource set. That is, the set of PUSCH repetition transmissions is transmitted towards the second TRP (i.e., TRP 2).
  The first SRI field is used to indicate the SRS resource(s) configured in the second SRS resource set for the set of PUSCH repetition transmissions, while the second SRI field is not used and can be ignored by the UE. That is, the first SRI field is associated with the second SRS resource set. Also, the first TPMI field is used and is associated with the second SRS resource set if the set of PUSCH repetition transmissions is codebook based, while the second TPMI field is not used and can be ignored by the UE.
The PUSCH mode field being "10" means that:
  The set of PUSCH repetition transmissions is M-TRP based.
  The set of PUSCH repetition transmissions is transmitted according to both the SRS resource(s) in the first SRS resource set and the SRS resource(s) in the second SRS resource set. That is, the set of PUSCH repetition transmissions is transmitted towards both the first TRP (i.e., TRP 1) and the second TRP (i.e., TRP 2).
  Both the first SRI field and the second SRI field are used. The first SRI field is used to indicate the SRS resource(s) configured in the first SRS resource set for the PUSCH repetition transmission(s) towards TRP 1, and the second SRI field is used to indicate the SRS resource(s) configured in the second SRS resource set for the PUSCH repetition transmission(s) towards TRP 2. That is, the first SRI field is associated with the first SRS resource set and the second SRI field is associated with the second SRS resource set. Also, both the first TPMI field and the second TPMI field are used if the set of PUSCH repetition transmissions is codebook based, the first TPMI field is associated with the first SRS resource set and the second TPMI field is associated with the second SRS resource set.
  The set of PUSCH repetition transmissions is first transmitted towards TRP 1 and then towards TRP 2. That is, the set of PUSCH repetition transmissions is transmitted first according to the SRS resource(s) configured in the first SRS resource set and then based on the SRS resource(s) configured in the second SRS resource set. In the case that the set of PUSCH repetition transmissions is codebook based, the SRS resource(s) configured in the first SRS resource set is indicated by the first SRI field and the SRS resource(s) configured in the second SRS resource set is indicated by the second SRI field. In the case that the set of PUSCH repetition transmissions is non-codebook based, the SRS resource(s) configured in the first SRS resource set is indicated by the first SRI field, and the SRS resource(s) configured in the second SRS resource set is indicated by a combination of the first SRI field and the second SRI field. For example, the first SRI field may be used to indicate the rank (i.e., the number of layers) for the set of non-codebook based PUSCH repetition transmissions, and the second SRI field may be used to indicate the SRS resource(s) configured in the second SRS resource set corresponding to the rank indicated by the first SRI field.

The PUSCH mode field being "11" means that:

The set of PUSCH repetition transmissions is M-TRP based.

The set of PUSCH repetition transmissions is transmitted according to both the SRS resource(s) in the first SRS resource set and the SRS resource(s) in the second SRS resource set. That is, the set of PUSCH repetition transmissions is transmitted towards both the first TRP (i.e., TRP 1) and the second TRP (i.e., TRP 2).

Both the first SRI field and the second SRI field are used. The first SRI field is used to indicate the SRS resource(s) configured in the first SRS resource set for the PUSCH repetition transmission(s) towards TRP 1, and the second SRI field is used to indicate the SRS resource(s) configured in the second SRS resource set for the PUSCH repetition transmission(s) towards TRP 2. That is, the first SRI field is associated with the first SRS resource set and the second SRI field is associated with the second SRS resource set. Also, both the first TPMI field and the second TPMI field are used if the set of PUSCH repetition transmissions is codebook based, the first TPMI field is associated with the first SRS resource set and the second TPMI field is associated with the second SRS resource set.

The set of PUSCH repetition transmissions is first transmitted towards TRP 2 and then towards TRP 1. That is, the set of PUSCH repetition transmissions is transmitted first according to the SRS resource(s) configured in the second SRS resource set and then based on the SRS resource(s) configured in the first SRS resource set. In the case that the set of PUSCH repetition transmissions is non-codebook based, the SRS resource(s) configured in the first SRS resource set is indicated by the first SRI field, and the SRS resource(s) configured in the second SRS resource set is indicated by a combination of the first SRI field and the second SRI field. For example, the first SRI field may be used to indicate the rank (i.e., the number of layers) for the set of non-codebook based PUSCH repetition transmissions, and the second SRI field may be used to indicate the SRS resource(s) configured in the second SRS resource set corresponding to the rank indicated by the first SRI field.

FIG. 2A illustrates exemplary PUSCH repetition transmissions towards multiple TRPs based on different values of the PUSCH mode field according to some embodiments of the present application.

In the example of FIG. 2A, it is assumed that the repetition number of the set of PUSCH repetition transmissions is 8 (i.e., each of the 8 PUSCH repetition transmissions carries a same TB) and the M-TRP based PUSCH repetition transmission pattern is sequential. That is, two consecutive PUSCH repetition transmissions towards a TRP followed by another two consecutive PUSCH repetition transmissions towards another TRP are transmitted until reaching the repetition number of the PUSCH repetition transmissions. Then the PUSCH repetition transmissions for PUSCH mode field being "10" and "11" are illustrated in FIG. 2A.

Referring to FIG. 2A, the PUSCH mode field being "10" indicates that the first two PUSCH repetition transmissions (i.e., PUSCH repetition transmission #1 and PUSCH repetition transmission #2) are transmitted according to the SRS resource(s) configured in the first SRS resource set, which is followed by two PUSCH repetition transmissions (i.e., PUSCH repetition transmission #3 and PUSCH repetition transmission #4) transmitted according to the SRS resource(s) configured in the second SRS resource set. Such kind of sequence will be repeated until the 8 PUSCH repetition transmissions are reached.

The PUSCH mode field being "11" indicates that the first two PUSCH repetition transmissions (i.e., PUSCH repetition transmission #1 and PUSCH repetition transmission #2) are transmitted according to the SRS resource(s) configured in the second SRS resource set, which is followed by two PUSCH repetition transmissions (i.e., PUSCH repetition transmission #3 and PUSCH repetition transmission #4) based on the SRS resource(s) configured in the first SRS resource set. Such kind of sequence will be repeated until the 8 PUSCH repetition transmissions are reached.

FIG. 2B illustrates another exemplary PUSCH repetition transmissions towards multiple TRPs based on different values of the PUSCH mode field according to some embodiments of the present application.

In the example of FIG. 2B, it is assumed that the repetition number of the set of PUSCH repetition transmissions is 8 and the M-TRP based PUSCH repetition transmission pattern is cyclical. That is, one PUSCH repetition transmission towards a TRP followed by another PUSCH repetition transmission towards another TRP is transmitted until reaching the repetition number of the PUSCH repetition transmissions. Then the PUSCH repetition transmissions for PUSCH mode field being "10" and "11" are illustrated in FIG. 2B.

Referring to FIG. 2B, the PUSCH mode field being "10" indicates that the first PUSCH repetition transmission (i.e., PUSCH repetition transmission #1) is transmitted according to the SRS resource(s) configured in the first SRS resource set, which is followed by one PUSCH repetition transmission (i.e., PUSCH repetition transmission #2) transmitted according to the SRS resource(s) configured in the second SRS resource set. Such kind of sequence will be repeated until the 8 PUSCH repetition transmissions are reached.

The PUSCH mode field being "11" indicates that the first PUSCH repetition transmission (i.e., PUSCH repetition transmission #1) is transmitted according to the SRS resource(s) configured in the second SRS resource set, which is followed by one PUSCH repetition transmission (i.e., PUSCH repetition transmission #2) transmitted according to the SRS resource(s) configured in the first SRS resource set. Such kind of sequence will be repeated until the 8 PUSCH repetition transmissions are reached.

For single DCI based M-TRP PUSCH Type B repetition schemes with a maximum number of layers of a PUSCH repetition transmission being 2, the PTRS-DMRS association field in DCI (e.g., DCI format 0_1 or DCI format 0_2) is 2 bits to indicate two PTRS-DMRS associations, wherein the MSB and the LSB indicate associations between PTRS port(s) and DMRS port(s) for two TRPs respectively. When a UE performs M-TRP based PUSCH repetition transmission, it needs to know whether the association between PTRS port(s) and DMRS port(s) indicated by the MSB or the LSB of the PTRS-DMRS association field should be used for each of the set of PUSCH repetition transmissions. That is, the mapping relationship (or the mapping rule) between the PTRS port(s) and DMRS port(s) association indicated by the MSB or the LSB of the PTRS-DMRS association field and each PUSCH repetition transmission should be determined.

For single DCI based M-TRP PUSCH repetition schemes with a maximum number of layers of a PUSCH repetition transmission being more than 2, when a 2-bit PTRS-DMRS association field is also used to indicate two PTRS-DMRS associations with the MSB and the LSB for indicating associations between PTRS port(s) and DMRS port(s) for two TRPs respectively, the mapping relationship between the PTRS port(s) and DMRS port(s) association indicated by the MSB or the LSB of the PTRS-DMRS association field and each PUSCH repetition transmission also should be determined.

The present disclosure proposes several solutions for determining the mapping relationship between PTRS-DMRS association(s) indicated by the PTRS-DMRS association field and PUSCH repetition transmission(s) in M-TRP mode.

Solution 1

In solution 1, the PTRS-DMRS association indicated by one bit (e.g., the MSB) in the PTRS-DMRS association field is used for the PUSCH repetition transmission(s) according to SRS resource(s) configured in the first SRS resource set (i.e., the PUSCH repetition transmission(s) towards the first TRP); the PTRS-DMRS association indicated by the other bit (e.g., the LSB) in the PTRS-DMRS association field is used for the PUSCH repetition transmission(s) according to SRS resource(s) configured in the second SRS resource set (i.e., the PUSCH repetition transmission(s) towards the second TRP).

For example, it is supposed that solution 1 is applied to the exemplary PUSCH repetition transmissions shown in FIG. 2A, which are codebook based PUSCH repetition transmissions, the actual number of PTRS ports indicated for each TRP is one (e.g., PTRS port 0), the number of layers of each PUSCH repetition transmission is two, and the DMRS ports indicated by an antenna port field in the DCI are {DMRS port 0, DMRS port 1} (i.e., DMRS port 0 is the $1^{st}$ scheduled DMRS port, and DMRS port 1 is the $2^{nd}$ scheduled DMRS port).

The following Table 2 is an exemplary association table providing the PTRS-DMRS association for one PTRS port.

TABLE 2

| PTRS-DMRS association for one PTRS port | |
|---|---|
| Value of MSB or LSB of PTRS-DMRS association field | DMRS port |
| 0 | $1^{st}$ scheduled DMRS port |
| 1 | $2^{nd}$ scheduled DMRS port |

Based on the values of the two bits in the PTRS-DMRS association field, there are four cases:

Case 1: the PTRS-DMRS association field is "00."

Since the value of the MSB is "0," according to Table 2, PTRS port 0 is associated with the $1^{st}$ scheduled DMRS port (i.e., DMRS port 0) for the PUSCH repetition transmissions according to SRS resource(s) configured in the first SRS resource set. Since the value of the LSB is "0," according to Table 2, PTRS port 0 is also associated with DMRS port 0 for the PUSCH repetition transmissions according to SRS resource(s) configured in the second SRS resource set. Therefore, no matter whether the PUSCH mode field is "10" or "11," PTRS port 0 is associated with DMRS port 0 for all of the eight PUSCH repetition transmissions (i.e., PUSCH repetition transmission #1, PUSCH repetition transmission #2 . . . , PUSCH repetition transmission #8).

Case 2: the PTRS-DMRS association field is "01."

Since the value of the MSB is "0," according to Table 2, PTRS port 0 is associated with DMRS port 0 for the PUSCH repetition transmissions according to SRS resource(s) configured in the first SRS resource set. Since the value of the LSB is "1," according to Table 2, PTRS port 0 is associated with the $2^{nd}$ scheduled DMRS port (i.e., DMRS port 1) for the PUSCH repetition transmissions according to SRS resource(s) configured in the second SRS resource set.

Therefore, when the PUSCH mode field is "10," PTRS port 0 is associated with DMRS port 0 for PUSCH repetition transmission #1, PUSCH repetition transmission #2, PUSCH repetition transmission #5 and PUSCH repetition transmission #6, and PTRS port 0 is associated with DMRS port 1 for PUSCH repetition transmission #3, PUSCH repetition transmission #4, PUSCH repetition transmission #7 and PUSCH repetition transmission #8; when the PUSCH mode field is "11," PTRS port 0 is associated with DMRS port 0 for PUSCH repetition transmission #3, PUSCH repetition transmission #4, PUSCH repetition transmission #7 and PUSCH repetition transmission #8, and PTRS port 0 is associated with DMRS port 1 for PUSCH repetition transmission #1, PUSCH repetition transmission #2, PUSCH repetition transmission #5 and PUSCH repetition transmission #6.

Case 3: the PTRS-DMRS association field is "10."

Since the value of the MSB is "1," according to Table 2, PTRS port 0 is associated with DMRS port 1 for the PUSCH repetition transmissions according to SRS resource(s) configured in the first SRS resource set. Since the value of the LSB is "0," according to Table 2, PTRS port 0 is associated with DMRS port 0 for the PUSCH repetition transmissions according to SRS resource(s) configured in the second SRS resource set.

Therefore, when the PUSCH mode field is "10," PTRS port 0 is associated with DMRS port 1 for PUSCH repetition transmission #1, PUSCH repetition transmission #2, PUSCH repetition transmission #5 and PUSCH repetition transmission #6, and PTRS port 0 is associated with DMRS port 0 for PUSCH repetition transmission #3, PUSCH repetition transmission #4, PUSCH repetition transmission #7 and PUSCH repetition transmission #8; when the PUSCH mode field is "11," PTRS port 0 is associated with DMRS port 1 for PUSCH repetition transmission #3, PUSCH repetition transmission #4, PUSCH repetition transmission #7 and PUSCH repetition transmission #8, and PTRS port 0 is associated with DMRS port 0 for PUSCH repetition transmission #1, PUSCH repetition transmission #2, PUSCH repetition transmission #5 and PUSCH repetition transmission #6.

Case 4: the PTRS-DMRS association field is "11."

Since the value of the MSB is "1," according to Table 2, PTRS port 0 is associated with DMRS port 1 for the PUSCH repetition transmissions according to SRS resource(s) configured in the first SRS resource set. Since the value of the LSB is "1," according to Table 2, PTRS port 0 is also associated with DMRS port 1 for the PUSCH repetition transmissions according to SRS resource(s) configured in the second SRS resource set. Therefore, no matter whether the PUSCH mode field is "10" or "11," PTRS port 0 is associated with DMRS port 1 for all of the eight PUSCH repetition transmissions (i.e., PUSCH repetition transmission #1, PUSCH repetition transmission #2 . . . , PUSCH repetition transmission #8).

Solution 2

In solution 2, the PTRS-DMRS association indicated by one bit (e.g., the MSB) in the PTRS-DMRS association field is used for the first PUSCH repetition transmission (i.e., the first one in transmission order among the set of PUSCH repetition transmissions scheduled by the DCI) and the other PUSCH repetition transmission(s) according to SRS resource(s) configured in the same SRS resource set as the first PUSCH repetition transmission (in other words, the PTRS-DMRS association indicated by the one bit is used for PUSCH repetition transmission(s) according to SRS resource(s) configured in an SRS resource set according to which the first PUSCH repetition transmission is transmitted), and the PTRS-DMRS association indicated by the other bit (e.g., the LSB) in the PTRS-DMRS association field is used for the PUSCH repetition transmission(s) according to SRS resource(s) configured in the other SRS resource set.

For example, it is supposed that solution 2 is applied to the exemplary PUSCH repetition transmissions shown in FIG. 2A, which are codebook based PUSCH repetition transmissions, the actual number of PTRS ports indicated for each TRP is one (e.g., PTRS port 0), the number of layers of each PUSCH repetition transmission is two, and the DMRS ports indicated in the DCI are {DMRS port 0, DMRS port 1} (i.e., DMRS port 0 is the $1^{st}$ scheduled DMRS port, and DMRS port 1 is the $2^{nd}$ scheduled DMRS port). Table 2 is also applied. Based on the values of the two bits in the PTRS-DMRS association field, there are four cases:

Case A: the PTRS-DMRS association field is "00."

Since the values of the MSB and the LSB are both "0," according to Table 2, PTRS port 0 is associated with DMRS port 0 for all of the eight PUSCH repetition transmissions regardless of whether the PUSCH mode field is "10" or "11."

Case B: the PTRS-DMRS association field is "01."

When the PUSCH mode field is "10," the first PUSCH repetition transmission, i.e., PUSCH repetition transmission #1, is transmitted according to SRS resource(s) in the first SRS resource set. Therefore, the PTRS-DMRS association indicated by the MSB is used for the PUSCH repetition transmissions according to the SRS resource(s) configured in the first SRS resource set, and the PTRS-DMRS association indicated by the LSB is used for the PUSCH repetition transmissions according to the SRS resource(s) configured in the second SRS resource set.

Since the value of the MSB is "0," according to Table 2, PTRS port 0 is associated with DMRS port 0 for PUSCH repetition transmission #1, PUSCH repetition transmission #2, PUSCH repetition transmission #5 and PUSCH repetition transmission #6. Since the value of the LSB is "1," according to Table 2, PTRS port 0 is associated with DMRS port 1 for PUSCH repetition transmission #3, PUSCH repetition transmission #4, PUSCH repetition transmission #7 and PUSCH repetition transmission #8.

When the PUSCH mode field is "11", the first PUSCH repetition transmission, i.e., PUSCH repetition transmission #1, is transmitted according to SRS resource(s) in the second SRS resource set. Therefore, the PTRS-DMRS association indicated by the MSB is used for the PUSCH repetition transmissions according to the SRS resource(s) configured in the second SRS resource set, and the PTRS-DMRS association indicated by the LSB is used for the PUSCH repetition transmissions according to the SRS resource(s) configured in the first SRS resource set.

Since the value of the MSB is "0," according to Table 2, PTRS port 0 is associated with DMRS port 0 for PUSCH repetition transmission #1, PUSCH repetition transmission #2, PUSCH repetition transmission #5 and PUSCH repetition transmission #6. Since the value of the LSB is "1," according to Table 2, PTRS port 0 is associated with DMRS port 1 for PUSCH repetition transmission #3, PUSCH repetition transmission #4, PUSCH repetition transmission #7 and PUSCH repetition transmission #8.

Case C: the PTRS-DMRS association field is "10."

When the PUSCH mode field is "10," since the value of the MSB is "1," according to Table 2, PTRS port 0 is associated with DMRS port 1 for the PUSCH repetition transmissions according to the SRS resource(s) configured in the first SRS resource set (i.e., PUSCH repetition transmission #1, PUSCH repetition transmission #2, PUSCH repetition transmission #5 and PUSCH repetition transmission #6); since the value of the LSB is "0," according to Table 2, PTRS port 0 is associated with DMRS port 0 for the PUSCH repetition transmissions according to the SRS resource(s) configured in the second SRS resource set (i.e., PUSCH repetition transmission #3, PUSCH repetition transmission #4, PUSCH repetition transmission #7 and PUSCH repetition transmission #8).

When the PUSCH mode field is "11," since the value of the MSB is "1," according to Table 2, PTRS port 0 is associated with DMRS port 1 for the PUSCH repetition transmissions according to the SRS resource(s) configured in the second SRS resource set (i.e., PUSCH repetition transmission #1, PUSCH repetition transmission #2, PUSCH repetition transmission #5 and PUSCH repetition transmission #6); since the value of the LSB is "0," according to Table 2, PTRS port 0 is associated with DMRS port 0 for the PUSCH repetition transmissions according to the SRS resource(s) configured in the first SRS resource set (i.e., PUSCH repetition transmission #3, PUSCH repetition transmission #4, PUSCH repetition transmission #7 and PUSCH repetition transmission #8).

Case D: the PTRS-DMRS association field is "11."

Since the values of the MSB and the LSB are both "1," according to Table 2, PTRS port 0 is associated with DMRS port 1 for all of the eight PUSCH repetition transmissions regardless of whether the PUSCH mode field is "10" or "11."

As another example, it is supposed that a DCI, for example, DCI format 0_1 or DCI format 0_2, schedules a set of non-codebook based PUSCH repetition transmissions, and two SRS resource sets for non-codebook based PUSCH repetition transmissions are configured for the UE. The first SRS resource set includes four SRS resources (i.e., SRS resource 0, SRS resource 1, SRS resource 2, and SRS resource 3) for the first TRP. The second SRS resource set also includes four SRS resources for the second TRP.

It is further supposed that the PTRS port indexes for SRS resource 0 and SRS resource 2 configured in the first SRS resource set are configured as 0, and the PTRS port indexes for SRS resource 1 and SRS resource 3 configured in the first SRS resource set are configured as 1. The PTRS port indexes for the four SRS resources configured in the second SRS resource set are configured as 0, 0, 1, and 1 respectively. The number of layers of each PUSCH repetition transmission is four, and the DMRS ports indicated in the DCI are {DMRS port 0, DMRS port 1, DMRS port 2, DMRS port 3}. That is, for PUSCH repetition transmission(s) according to the SRS resource(s) configured in the first SRS resource set, DMRS port 0 and DMRS port 2 are the $1^{st}$ DMRS port and the $2^{nd}$ DMRS port share PTRS port 0 respectively, and DMRS port 1 and DMRS port 3 are the $1^{st}$ DMRS port and the $2^{nd}$ DMRS port share PTRS port 1 respectively; for PUSCH repetition transmission(s) according to the SRS resource(s) configured in the second SRS resource set, DMRS port 0 and DMRS port 1 are the $1^{st}$ DMRS port and the $2^{nd}$ DMRS port share PTRS port 0 respectively, and DMRS port 2 and DMRS port 3 are the $1^{st}$ DMRS port and the $2^{nd}$ DMRS port share PTRS port 1 respectively. The first and second SRI fields indicate the four SRS resources in each SRS resource set respectively.

The following Table 3 is an exemplary association table providing the PTRS-DMRS association for two PTRS ports (i.e., PTRS port 0 and PTRS port 1).

TABLE 3

PTRS-DMRS association for two PTRS ports

| Value of MSB or LSB of PTRS-DMRS association field | DMRS port associated with PTRS port 0 | DMRS port associated with PTRS port 1 |
|---|---|---|
| 0 | $1^{st}$ DMRS port which shares PTRS port 0 | $1^{st}$ DMRS port which shares PTRS port 1 |
| 1 | $2^{nd}$ DMRS port which shares PTRS port 0 | $2^{nd}$ DMRS port which shares PTRS port 1 |

In this example, it is supposed that the PUSCH mode field is "11." Thus, the MSB of the PTRS-DMRS association field is used to indicate the PTRS-DMRS association for the PUSCH repetition transmission(s) according to the SRS resource(s) configured in the second SRS resource set since the first PUSCH repetition transmission is according to the second SRS resource set, and the LSB of the PTRS-DMRS association field is used to indicate the PTRS-DMRS association for the PUSCH repetition transmission(s) according to the SRS resource(s) configured in the first SRS resource set. There are four different cases according to the four different values of the PTRS-DMRS association field:

Case i): the PTRS-DMRS association field is "00."

The PTRS-DMRS association indicated by the MSB (i.e., 0), i.e., PTRS port 0 associated with DMRS port 0 and PTRS port 1 associated with DMRS port 2 according to Table 3, is used for PUSCH repetition transmission(s) according to the SRS resource(s) configured in the second SRS resource set. The PTRS-DMRS association indicated by the LSB (i.e. 0), i.e., PTRS port 0 associated with DMRS port 0 and PTRS port 1 associated with DMRS port 1 according to Table 3, is used for PUSCH repetition transmission(s) according to the SRS resource(s) configured in the first SRS resource set.

Case ii): the PTRS-DMRS association field is "01."

The PTRS-DMRS association indicated by the MSB (i.e., 0), i.e., PTRS port 0 associated with DMRS port 0 and PTRS port 1 associated with DMRS port 2 according to Table 3, is used for PUSCH repetition transmission(s) according to the SRS resource(s) configured in the second SRS resource set. The PTRS-DMRS association indicated by the LSB (i.e., 1), i.e., PTRS port 0 associated with DMRS port 2 and PTRS port 1 associated with DMRS port 3 according to Table 3, is used for PUSCH repetition transmission(s) according to the SRS resource(s) configured in the first SRS resource set.

Case iii): the PTRS-DMRS association field is "10."

The PTRS-DMRS association indicated by the MSB (i.e., 1), i.e., PTRS port 0 associated with DMRS port 1 and PTRS port 1 associated with DMRS port 3 according to Table 3, is used for PUSCH repetition transmission(s) according to the SRS resource(s) configured in the second SRS resource set. The PTRS-DMRS association indicated by the LSB (i.e. 0), i.e., PTRS port 0 associated with DMRS port 0 and PTRS port 1 associated with DMRS port 1 according to Table 3, is used for PUSCH repetition transmission(s) according to the SRS resource(s) configured in the first SRS resource set.

Case iv): the PTRS-DMRS association field is "11."

The PTRS-DMRS association indicated by the MSB (i.e., 1), i.e., PTRS port 0 associated with DMRS port 1 and PTRS port 1 associated with DMRS port 3 according to Table 3, is used for PUSCH repetition transmission(s) according to the SRS resource(s) configured in the second SRS resource set. The PTRS-DMRS association indicated by the LSB (i.e. 1), i.e., PTRS port 0 associated with DMRS port 2 and PTRS port 1 associated with DMRS port 3 according to Table 3, is used for PUSCH repetition transmission(s) according to the SRS resource(s) configured in the first SRS resource set.

Solution 3

In solution 3, the PTRS-DMRS association indicated by one bit (e.g., the MSB) in the PTRS-DMRS association field is used for PUSCH repetition transmission(s) according to SRS resource(s) configured in the SRS resource set indicated by the first SRI field in the DCI, and the PTRS-DMRS association indicated by the other bit (e.g., the LSB) in the PTRS-DMRS association field is used for PUSCH repetition transmission(s) according to SRS resource(s) configured in the SRS resource set indicated by the second SRI field in the DCI.

According to Table 1, when the PUSCH mode field indicates a M-TRP based PUSCH repetition transmission, the value of the PUSCH mode field is "10" or "11," the first SRI field is used to indicate SRS resource(s) configured in the first SRS resource set, and the second SRI field is used to indicate SRS resource(s) configured in the second SRS resource set. In such cases, when solution 3 is applied, the PTRS-DMRS association indicated by the one bit (e.g., the MSB) in the PTRS-DMRS association field is used for PUSCH repetition transmission(s) according to SRS resource(s) configured in the first SRS resource set, and the PTRS-DMRS association indicated by the other bit (e.g., the LSB) in the PTRS-DMRS association field is used for PUSCH repetition transmission(s) according to SRS resource(s) configured in the second SRS resource set, which is the same as solution 1.

For S-TRP based PUSCH repetition transmission, e.g., when the value of the PUSCH mode field, which is used for dynamic switching between S-TRP based and M-TRP based PUSCH repetition transmissions, is "00" or "01," the interpretation of the 2-bit PTRS-DMRS port association field is different from that for M-TRP based PUSCH repetition transmission as described above since the field only indicates one PTRS-DMRS association. The present disclosure also proposes some solutions for interpreting the 2-bit PTRS-DMRS association field for S-TRP based PUSCH repetition transmissions.

It should be noted that the interpretation of the PTRS-DMRS port association field can be implemented in both UE side and BS side in a similar way. For example, the BS may first determine a PTRS-DMRS association used for the S-TRP based PUSCH repetition transmission, and then generate 2 bits for the PTRS-DMRS association field to indicate the PTRS-DMRS association based on the interpretation of the PTRS-DMRS port association field.

Solution 4

In solution 4, each of the MSB and the LSB of the PTRS-DMRS association field may associate or correspond to a respective SRS resource set of the first SRS resource set and the second SRS resource set, which can be similar to any of solution 1, solution 2, and solution 3 as described above, but in S-TRP mode, only the bit corresponding to the SRS resource set for the single TRP is used, while the other bit is ignored.

For example, when the PUSCH mode field is "00." that is PUSCH repetition transmission(s) is (are) only transmitted according to SRS resource(s) configured in the first SRS resource set indicated by the first SRI field, only the bit of the two-bit PTRS-DMRS association field corresponding to the first SRS resource set is valid, and the other bit is not used. In the case that the abovementioned solution 1 or solution 2 is applied, the PTRS-DMRS association indicated by the MSB of the PTRS-DMRS association field is used for PUSCH repetition transmission(s) according to SRS resource(s) configured in the first SRS resource set. Thus, only the MSB of the PTRS-DMRS association field is used for indicating the PTRS-DMRS association for the S-TRP based PUSCH repetition transmission(s) and the LSB is not used. Therefore, the UE shall ignore the LSB of the PTRS-DMRS association field.

For example, when the PUSCH mode field is "01," that is PUSCH repetition transmission(s) is (are) only transmitted according to the SRS resource(s) configured in the second SRS resource set indicated by the first SRI field, only the bit of PTRS-DMRS association field corresponding to the second SRS resource set is valid, and the other bit is not used. In the case that the abovementioned solution 1 is applied, only the LSB of the PTRS-DMRS association field is used for indicating the PTRS-DMRS association for the S-TRP based PUSCH repetition transmission(s) and the MSB is not used. Thus, the UE shall ignore the MSB. In the case that the abovementioned solution 2 is applied, since the MSB of the PTRS-DMRS association field is used for indicating PTRS-DMRS association for the first PUSCH repetition transmission which is transmitted according to SRS resource(s) configured in the second SRS resource set, only the MSB of the PTRS-DMRS association field is used for indicating the PTRS-DMRS association for the S-TRP based PUSCH repetition transmission(s) and the LSB is ignored.

In the case that the abovementioned solution 3 is applied, no matter whether the PUSCH mode field is "00" or "01," the first SRI field in the DCI is used for indicating SRS resource(s) for the set of PUSCH repetition transmissions. Therefore, when the PUSCH mode field indicates an S-TRP based PUSCH repetition transmission, the MSB of the PTRS-DMRS association field is always used for indicating PTRS-DMRS association for the PUSCH repetition transmission and the LSB is not used.

For example, it is supposed that a DCI (e.g., a DCI format 0_1) schedules a set of codebook based PUSCH repetition transmissions and two SRS resource sets for codebook based PUSCH repetition transmissions are configured for a UE with each SRS resource set for each TRP. The number of layers of each PUSCH repetition transmission is four, and the DMRS ports indicated in the DCI are {DMRS port 0, DMRS port 1, DMRS port 2, DMRS port 3}.

In this example, it is supposed that the number of PTRS ports for each TRP is two, DMRS port 0 and DMRS port 1 share PTRS port 0, and DMRS port 2 and DMRS port 3 share PTRS port 1. The repetition number of the PUSCH repetition transmissions is 8, and each PUSCH repetition transmission carries a same TB. Furthermore, in M-TRP mode, the MSB of the PTRS-DMRS association field is used for indicating PTRS-DMRS association for a TRP, and the LSB of the PTRS-DMRS association field is used for indicating PTRS-DMRS association for another TRP.

When the PUSCH mode field is "00," which means that the set of PUSCH repetition transmissions is transmitted only according to the SRS resource(s) configured in the first SRS resource set. Regardless of which of solution 1, solution 2, and solution 3 is applied, only the MSB of the PTRS-DMRS association field is used for indicating the PTRS-DMRS association for the set of PUSCH repetition transmissions. Table 3 can also be applied. That is, when the PTRS-DMRS association field in the DCI is "00" or "01," the PTRS-DMRS association indicated by the MSB (i.e., 0), i.e., PTRS port 0 associated with DMRS port 0 and PTRS port 1 associated with DMRS port 2, is used for all of the PUSCH repetition transmissions. When the PTRS-DMRS association field is "10" or "11," the PTRS-DMRS association indicated by the MSB (i.e., 1), i.e., PTRS port 0 associated with DMRS port 1 and PTRS port 1 associated with DMRS port 3, is used for all the PUSCH repetition transmissions.

When the PUSCH mode field is "01," which means that the set of PUSCH repetition transmissions is transmitted only according to the SRS resource(s) configured in the second SRS resource set. In the case that the above solution 2 or solution 3 is applied, only the MSB of the PTRS-DMRS association field is used for indicating the PTRS-DMRS association for the set of PUSCH repetition transmissions.

In the case that solution 1 is applied, only the LSB of the PTRS-DMRS association field is used for indicating the PTRS-DMRS association for the set of PUSCH repetition transmissions since the LSB corresponds to the second SRS resource set. Table 3 can also be applied. That is, when the PTRS-DMRS association field is "00" or "10," the PTRS-DMRS association indicated by the LSB (i.e., 0), i.e., PTRS port 0 associated with DMRS port 0 and PTRS port 1 associated with DMRS port 2, is used for all of the PUSCH repetition transmissions and the MSB is ignored. When the PTRS-DMRS association field is "01" or "11," the PTRS-DMRS association indicated by the LSB (i.e., 1), i.e., PTRS port 0 associated with DMRS port 1 and PTRS port 1 associated with DMRS port 3, is used for all the PUSCH repetition transmissions.

Solution 5

In solution 5, the two bits in the PTRS-DMRS association field are both used for indicating the PTRS-DMRS association for the S-TRP based PUSCH repetition transmission(s).

For example, the following Table 4 is an exemplary association table providing the PTRS-DMRS association for two PTRS ports (i.e., PTRS port 0 and PTRS port 1).

TABLE 4

PTRS-DMRS association for two PTRS ports

| Value of MSB of PTRS-DMRS association field | DMRS port associated with PTRS port 0 | Value of LSB of PTRS-DMRS association field | DMRS port associated with PTRS port 1 |
|---|---|---|---|
| 0 | $1^{st}$ DMRS port which shares PTRS port 0 | 0 | $1^{st}$ DMRS port which shares PTRS port 1 |
| 1 | $2^{nd}$ DMRS port which shares PTRS port 0 | 1 | $2^{nd}$ DMRS port which shares PTRS port 1 |

It is supposed that a DCI (e.g., a DCI format 0_1) schedules a set of codebook based PUSCH repetition transmissions and two SRS resource sets for codebook based PUSCH repetition transmissions are configured for a UE with each SRS resource set for each TRP. The number of layers of each PUSCH repetition transmission is four, and the DMRS ports indicated in the DCI are {DMRS port 0, DMRS port 1, DMRS port 2, DMRS port 3}.

In this example, it is supposed that the number of PTRS ports for each TRP is two, DMRS port 0 and DMRS port 1 share PTRS port 0, and DMRS port 2 and DMRS port 3 share PTRS port 1. The repetition number of the PUSCH repetition transmissions is 8, and each PUSCH repetition transmission carries a same TB. Furthermore, in M-TRP mode, the MSB of the PTRS-DMRS association field is used for indicating PTRS-DMRS association for a TRP, and the LSB of the PTRS-DMRS association field is used for indicating PTRS-DMRS association for another TRP.

When the PUSCH mode field is "00" or "01" indicating S-TRP based PUSCH repetition transmissions, according to the value of the PTRS-DMRS association field, there are four cases:

Case a): the PTRS-DMRS association field is "00."

According to Table 4, the PTRS-DMRS association (i.e., PTRS port 0 associated with DMRS port 0 as indicated by the MSB and PTRS port 1 associated with DMRS port 2 as indicated by the LSB) is used for each PUSCH repetition transmission.

Case b): the PTRS-DMRS association field is "01."

According to Table 4, the PTRS-DMRS association (i.e., PTRS port 0 associated with DMRS port 0 as indicated by the MSB and PTRS port 1 associated with DMRS port 3 as indicated by the LSB) is used for each PUSCH repetition transmission.

Case c): the PTRS-DMRS association field is "10."

According to Table 4, the PTRS-DMRS association (i.e., PTRS port 0 associated DMRS port 1 as indicated by the MSB and PTRS port 1 associated DMRS port 2 as indicated by the LSB) is used for each PUSCH repetition transmission.

Case d): PTRS-DMRS association field is "11."

According to Table 4, the PTRS-DMRS association (i.e., PTRS port 0 associated DMRS port 1 as indicated by the MSB and PTRS port 1 associated DMRS port 3 as indicated by the LSB) is used for each PUSCH repetition transmission.

In the examples described above, the numbers of PTRS ports for different TRPs are identical. In some cases, the numbers of PTRS ports for different TRPs are different, for example, one PTRS port is indicated for one TRP, and two PTRS ports are indicated for another TRP.

For codebook based PUSCH repetition transmission, the actual number of PTRS port(s) is determined based on the precoder matrix indicated by the TPMI field in the DCI. For non-codebook based PUSCH repetition transmission, the actual number of PTRS port(s) is determined based on the SRI field in the DCI. In Rel-17, two TMPI fields and two SRI fields in a DCI are introduced with one TMPI field or one SRI field for one TRP. Accordingly, the numbers of PTRS ports for different TRPs may be different.

The present disclosure proposes solutions for interpreting the PTRS-DMRS association field under this case.

Solution 6

When the maximum number of layers of PUSCH repetition transmission is 2, the PTRS-DMRS association indicated by the MSB or LSB of the PTRS-DMRS association field is for one TRP respectively. If the actual numbers of PTRS ports indicated for different TRPs are different (e.g., the number of PTRS port indicated for one TRP is one and the number of PTRS ports indicated for another TRP is two), for PUSCH repetition transmission(s) transmitted to the TRP (or according to an SRS resource set) with one PTRS port, the first two codepoints of the 2-bit PTRS-DMRS association field in Table 5 below or in Table 2 can be used to interpret the MSB or LSB of the PTRS-DMRS association field.

TABLE 5

PTRS-DMRS association for one PTRS port

| value of PTRS-DMRS association field | DMRS port |
|---|---|
| 0 | $1^{st}$ scheduled DMRS port |
| 1 | $2^{nd}$ scheduled DMRS port |
| 2 | $3^{rd}$ scheduled DMRS port |
| 3 | $4^{th}$ scheduled DMRS port |

For PUSCH repetition transmission(s) transmitted to the TRP with two PTRS ports, PTRS port 0 may be associated with the first scheduled DMRS port and PTRS port 1 may be associated with the second scheduled DMRS port.

When the maximum number of layers of PUSCH repetition transmission is more than 2, if the MSB of the PTRS-DMRS association field is used for indicating the PTRS-DMRS association for a TRP, and the LSB of the PTRS-DMRS association field is used for indicating the PTRS-DMRS association for another TRP, for PUSCH repetition transmission(s) transmitted to the TRP (or according to an SRS resource set) with one PTRS port, first two codepoints of the 2-bit PTRS-DMRS association field in Table 5 or codepoints in Table 2 can be used to interpret the corresponding MSB or LSB. For PUSCH repetition transmission(s) transmitted to the TRP (or according to another SRS resource set) with two PTRS ports, codepoints of PTRS-DMRS association field in the above Table 3 or Table 4 can be used to interpret the corresponding MSB or LSB.

When the maximum number of layers of PUSCH repetition transmission is more than 2, if the PTRS-DMRS association field applies for PUSCH repetition transmission(s) transmitted to both TRPs, codepoints of the 2-bit PTRS-DMRS association field in Table 3 or Table 4 can be used together to interpret the PTRS-DMRS association for PUSCH repetition transmission(s) to the TRP (or according to an SRS resource set) with two PTRS ports, and codepoints of the 2-bit PTRS-DMRS association field in Table 5 can be used together to interpret the PTRS-DMRS association for PUSCH repetition transmission(s) to the TRP with one PTRS port.

For example, it is supposed that a DCI format 0_1 schedules a set of codebook based PUSCH repetition transmissions and two SRS resource sets for codebook based PUSCH repetition transmission are configured for a UE with one SRS resource set for one TRP. The number of layers of PUSCH repetition transmission is four and the DMRS ports indicated in the DCI are {DMRS port 0, DMRS port 1, DMRS port 2, DMRS port 3}.

The actual number of PTRS port for PUSCH repetition transmission(s) according to the SRS resource(s) configured in the first SRS resource set is one and the actual number of PTRS ports for PUSCH repetition transmission(s) according to the SRS resource(s) configured in the second SRS resource set is two. For PUSCH repetition transmission(s) according to the SRS resource(s) configured in the second SRS resource set. DMRS port 0 and DMRS port 1 share PTRS port 0, DMRS port 2 and DMRS port 3 share PTRS port 1.

It is further supposed that the MSB of the PTRS-DMRS association field is used for indicating PTRS-DMRS association for PUSCH repetition transmission(s) according to the SRS resource(s) configured in the first SRS resource set, and the LSB of the PTRS-DMRS association field is used for indicating PTRS-DMRS association for PUSCH repetition transmission(s) according to the SRS resource(s) configured in the second SRS resource set.

When the PTRS-DMRS association field is "00," referring to Table 5 above, the PTRS-DMRS association indicated by the MSB (i.e., 0), i.e., PTRS port 0 associated with DMRS port 0 (i.e., the first scheduled DMRS port)), is used for PUSCH repetition transmission(s) according to the SRS resource(s) configured in the first SRS resource set. Referring to Table 3 above, the PTRS-DMRS association indicated by the LSB (i.e., 0), i.e., PTRS port 0 associated with DMRS port 0 and PTRS port 1 associated with DMRS port 2, is used for PUSCH repetition transmission(s) according to the SRS resource(s) configured in the second SRS resource set.

When the PTRS-DMRS association field is "01," referring to Table 5 above, the PTRS-DMRS association indicated by the MSB (i.e., 0), i.e., PTRS port 0 associated with DMRS port 0, is used for PUSCH repetition transmission(s) according to the SRS resource(s) configured in the first SRS resource set. Referring to Table 3 above, the PTRS-DMRS association indicated by the LSB (i.e., 1), i.e., PTRS port 0 associated with DMRS port 1 and PTRS port 1 associated with DMRS port 3, is used for PUSCH repetition transmission(s) according to the SRS resource(s) configured in the second SRS resource set.

When the PTRS-DMRS association field is "10," referring to Table 5 above, the PTRS-DMRS association indicated by the MSB (i.e., 1), i.e., PTRS port 0 associated with DMRS port 1 (i.e., the second scheduled DMRS port)), is used for PUSCH repetition transmission(s) according to the SRS resource(s) configured in the first SRS resource set.

Referring to Table 3 above, the PTRS-DMRS association indicated by the LSB (i.e., 0), i.e., PTRS port 0 associated with DMRS port 0 and PTRS port 1 associated with DMRS port 2, is used for PUSCH repetition transmission(s) according to the SRS resource(s) configured in the second SRS resource set.

When the PTRS-DMRS association field is "11," referring to Table 5 above, the PTRS-DMRS association indicated by the MSB (i.e., 1), i.e., PTRS port 0 associated with DMRS port 1, is used for PUSCH repetition transmission(s) according to the SRS resource(s) configured in the first SRS resource set. Referring to Table 3 above, the PTRS-DMRS association indicated by the LSB (i.e., 1), i.e., PTRS port 0 associated with DMRS port 1 and PTRS port 1 associated with DMRS port 3, is used for PUSCH repetition transmission(s) according to the SRS resource(s) configured in the second SRS resource set.

Figure 3:
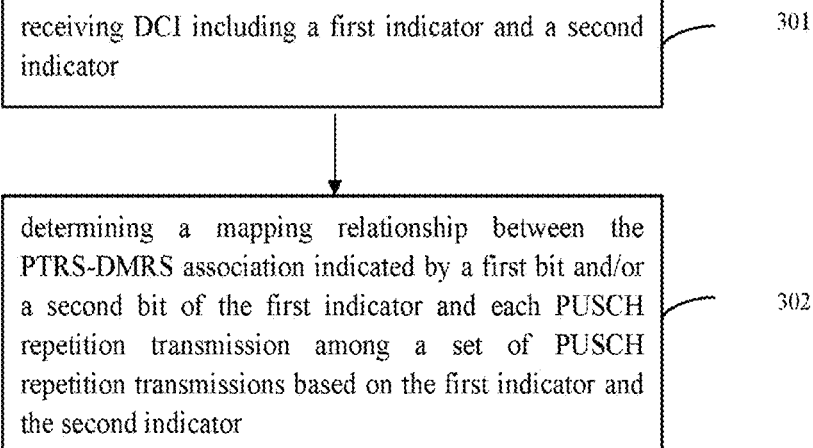
FIG. 3 illustrates a method performed by a UE for wireless communication according to some embodiments of the present disclosure.

FIG. 3 illustrates a method performed by a UE for wireless communication according to some embodiments of the present disclosure.

In step 301, the UE receives DCI including a first indicator and a second indicator. The first indicator may be the two-bit PTRS-DMRS association field, and the second indicator may be the PUSCH mode field. The first indicator includes a first bit and a second bit and indicates one or two PTRS-DMRS associations between PTRS port(s) and DMRS port(s). When the 2-bit first indicator indicates one PTRS-DMRS association, the PTRS-DMRS association is used for each of a set of scheduled PUSCH repetition transmissions. When the 2-bit first indicator indicates two PTRS-DMRS associations, for example, one PTRS-DMRS association is indicated by one bit (i.e., the MSB or the LSB) of the 2-bit first indicator, the two PTRS-DMRS associations are used for PUSCH repetition transmissions according to two SRS resource sets respectively. The second indicator indicates whether a set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set. For example, Table 1 mentioned above describes the indicating manner of the second indicator.

In step 302, the UE determines a mapping relationship between the PTRS-DMRS association indicated by the first bit and/or the second bit of the first indicator and each PUSCH repetition transmission among the set of PUSCH repetition transmissions based on the first indicator and the second indicator. For example, the UE may determine the mapping relationship according to any of solutions 1-6 as described above.

In some embodiments, the second indicator indicates that the set of PUSCH repetition transmissions is transmitted according to SRS resource(s) configured in both the first SRS resource set and the second SRS resource set. For example, when the PUSCH mode field is "10" or "11," it indicates that the set of PUSCH repetition transmissions is transmitted according to SRS resource(s) configured in both the first SRS resource set and the second SRS resource set.

In some embodiments, the UE determines that a first PTRS-DMRS association indicated by the first bit is used for PUSCH repetition transmission(s) according to SRS resource(s) configured in the first SRS resource set, and a second PTRS-DMRS association indicated by the second bit is used for PUSCH repetition transmission(s) according to SRS resource(s) configured in the second SRS resource set.

For example, in abovementioned solution 1, a first PTRS-DMRS association indicated by the MSB of the PTRS-DMRS association field is used for PUSCH repetition transmission(s) according to SRS resource(s) configured in the first SRS resource set, and a second PTRS-DMRS association indicated by the LSB of the PTRS-DMRS association field is used for PUSCH repetition transmission(s) according to SRS resource(s) configured in the second SRS resource set.

In some embodiments, the UE determines that a first PTRS-DMRS association indicated by the first bit is used for PUSCH repetition transmission(s) according to SRS resource(s) configured in an SRS resource set according to which a first one of the set of PUSCH repetition transmissions is transmitted, and a second PTRS-DMRS association indicated by the second bit is used for other PUSCH repetition transmission(s) of the set of PUSCH repetition transmissions. For example, when the first PUSCH repetition transmission is a PUSCH repetition transmission according to SRS resource(s) configured in the first SRS resource set, a first PTRS-DMRS association indicated by the MSB of the PTRS-DMRS association field is used for PUSCH repetition transmission(s) according to SRS resource(s) configured in the first SRS resource set, and a second PTRS-DMRS association indicated by the LSB of the PTRS-DMRS association field is used for PUSCH repetition transmission(s) according to SRS resource(s) configured in the second SRS resource set.

In some embodiments, the UE determines that a first PTRS-DMRS association indicated by the first bit is used for PUSCH repetition transmission(s) according to SRS resource(s) configured in an SRS resource set indicated by a first SRS resource indicator (SRI) field in the DCI, and a second PTRS-DMRS association indicated by the second bit is used for PUSCH repetition transmission(s) according to SRS resource(s) configured in an SRS resource set indicated by a second SRI field in the DCI.

In some embodiments, the second indicator indicates that the set of PUSCH repetition transmissions is transmitted according to SRS resource(s) configured in one SRS resource set of the first SRS resource set and the second SRS resource set. For example, when PUSCH mode field is "00" or "01," it indicates that the set of PUSCH repetition transmissions is transmitted according to SRS resource(s) configured in one SRS resource set.

In some embodiments, each of the first bit and the second bit corresponds to a respective SRS resource set of the first SRS resource set and the second SRS resource set, and the UE determines one bit of the first bit and the second bit which corresponds to the one SRS resource set to indicate a PTRS-DMRS association between PTRS port(s) and DMRS port(s) for each of the set of PUSCH repetition transmissions and ignores the other bit of the first bit and second bit. For example, only the MSB of the PTRS-DMRS association field is used for indicating the PTRS-DMRS association for each of the set of PUSCH repetition transmissions, and the LSB is not used, and the UE shall ignore the LSB of the PTRS-DMRS association field.

In some embodiments, the UE determines the first indicator including both the first bit and the second bit to indicate a PTRS-DMRS association between PTRS port(s) and DMRS port(s) for each of the set of PUSCH repetition transmissions. That is, the MSB and the LSB are combined together to indicate the PTRS-DMRS association for each PUSCH repetition transmission.

In some embodiments, a first total number of PTRS ports indicated for PUSCH repetition transmission(s) according to SRS resource(s) configured in the first SRS resource set is different from a second total number of PTRS ports indicated for PUSCH repetition transmission(s) according to SRS resource(s) configured in the second SRS resource set. For example, the number of PTRS ports for PUSCH repetition transmission(s) according to SRS resource(s) configured in the first SRS resource set may be one, and the number of PTRS ports for PUSCH repetition transmission(s) according to SRS resource(s) configured in the second SRS resource set may be two.

In some embodiments, the UE determines a first PTRS-DMRS association between PTRS port(s) and DMRS port(s) for PUSCH repetition transmission(s) according to SRS resource(s) configured in the first SRS resource set based on at least one of the first bit and the second bit according to a first association table, and the UE also determines a second PTRS-DMRS association between PTRS port(s) and DMRS port(s) for PUSCH repetition transmission(s) according to SRS resource(s) configured in the second SRS resource set based on at least one of the first bit and the second bit according to a second association table different from the first association table. For example, for PUSCH repetition transmission(s) to a TRP with one PTRS port, the PTRS-DMRS association indicated by one bit corresponding to the TRP or by both bits in the 2-bit PTRS-DMRS association field is interpreted according to the above Table 2 or Table 5. For PUSCH repetition transmission(s) to another TRP with two PTRS ports, the PTRS-DMRS association indicated by another bit corresponding to the another TRP or by both bits in the 2-bit PTRS-DMRS association field is interpreted according to the above Table 3 or Table 4.

Figure 4:
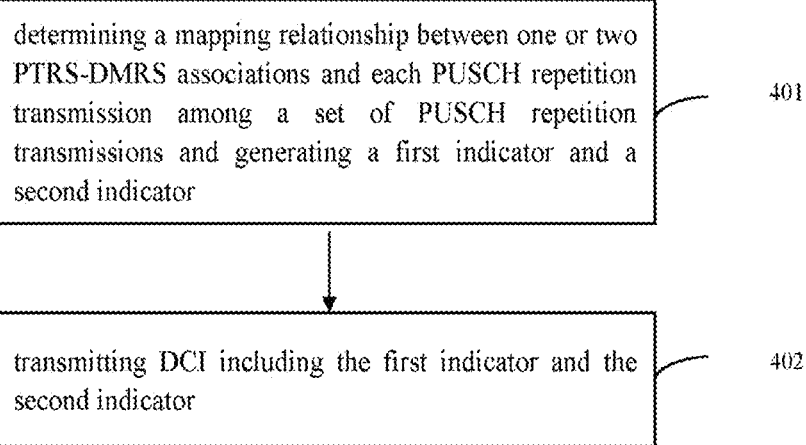
FIG. 4 illustrates a method performed by a BS for wireless communication according to some embodiments of the present disclosure.

FIG. 4 illustrates a method performed by a BS for wireless communication according to some embodiments of the present disclosure.

In step 401, the BS determines a mapping relationship between one or two PTRS-DMRS associations and each PUSCH repetition transmission among a set of PUSCH repetition transmissions and generates a first indicator and a second indicator, and in step 402, the BS transmits the DCI including the first indicator and the second indicator. The BS may generate the first indicator and the second indicator to reflect the mapping relationship according to any of solutions 1-6 as described above.

Figure 5:
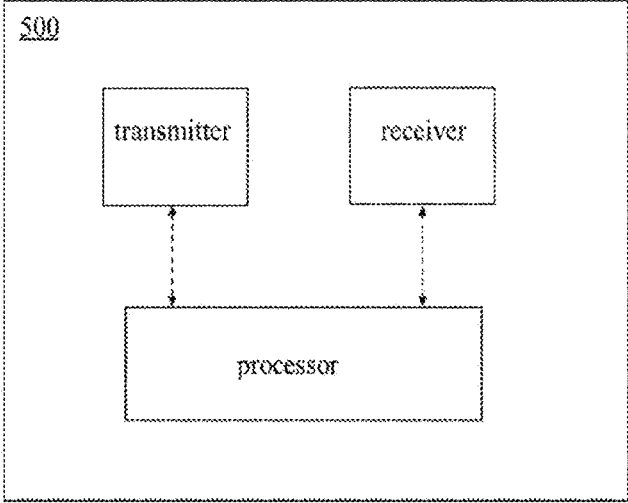
FIG. 5 illustrates a simplified block diagram of an exemplary apparatus for PUSCH repetition transmission according to some embodiments of the present disclosure.

FIG. 5 illustrates a simplified block diagram of an exemplary apparatus 500 according to some embodiments of the present application. The apparatus 500 may be or include at least a part of a BS (e.g., BS 101) or a UE (for example, UE 105a, UE 105b, or UE 105c) or other device with similar functionality.

The apparatus 500 may include a transmitter, a processor, and a receiver, and the transmitter and the receiver are coupled with the processor. In some embodiments, the transmitter and the receiver can be combined into a transceiver. The processor is configured to perform any of the methods described in the present disclosure, for example, the method described with respect to FIG. 3 or 4. For example, when the apparatus 500 is implemented as a UE, the receiver may receive DCI including a first indicator and a second indicator, wherein the first indicator includes a first bit and a second bit and indicates one or two PTRS-DMRS associations between PTRS port(s) and DMRS port(s), and wherein the second indicator indicates whether a set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set; the processor may determine a mapping relationship between the PTRS-DMRS association indicated by the first bit and/or the second bit of the first indicator and each PUSCH repetition transmission among the set of PUSCH repetition transmissions based on the first indicator and the second indicator.

When the apparatus 500 is implemented as a BS, the processor may determine a mapping relationship between one or two PTRS-DMRS associations and each PUSCH repetition transmission among a set of PUSCH repetition transmissions and generate a first indicator and a second indicator, wherein the first indicator includes a first bit and a second bit and indicates one or two PTRS-DMRS associations between PTRS port(s) and DMRS port(s), and wherein the second indicator indicates whether a set of PUSCH repetition transmissions is transmitted according to SRS resource(s) configured in a first SRS resource set, in a second SRS resource set, or in both the first SRS resource set and the second SRS resource set, and each PUSCH repetition transmission is transmitted according to SRS resource(s) configured in one of the first SRS resource set and the second SRS resource set; the transmitter may transmit DCI including the first indicator and the second indicator.

In some other embodiments, the processor may be configured to perform any of the methods described in the present disclosure by executing instructions stored on a medium (not shown in FIG. 5).

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for PUSCH repetition transmissions, including a processor and a memory. Computer programmable instructions for implementing a method for PUSCH repetition transmissions are stored in the memory, and the processor is configured to perform the computer programmable instructions to implement the method for PUSCH repetition transmissions. The method for PUSCH repetition transmissions may be any method as described in the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for PUSCH repetition transmissions according to any embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE), comprising:
at least one memory; and
at least one processor coupled with the at least one memory and configured to cause the UE to:
receive downlink control information (DCI) including a first indicator and a second indicator,
wherein the first indicator includes a first bit and a second bit and indicates one or two phase tracking reference signal (PTRS)-demodulation reference signal (DMRS) associations between one or more PTRS ports and one or more DMRS ports, and
wherein the second indicator indicates whether a set of physical uplink shared channel (PUSCH) repetition transmissions is transmitted according to one or more sounding reference signal (SRS) resources configured in at least one of a first SRS resource set or a second SRS resource set, and each PUSCH repetition transmission is transmitted according to the one or more SRS resources configured in one of the first SRS resource set or the second SRS resource set; and
determine a mapping relationship between the one or two PTRS-DMRS associations indicated by at least one of the first bit or the second bit of the first indicator and each PUSCH repetition transmission among the set of PUSCH repetition transmissions based on the first indicator and the second indicator.

2. The UE of claim 1, wherein the second indicator indicates that the set of PUSCH repetition transmissions is transmitted according to the one or more SRS resources configured in both the first SRS resource set and the second SRS resource set.

3. The UE of claim 2, wherein the at least one processor is configured to cause the UE to determine that a first PTRS-DMRS association indicated by the first bit is used for one or more PUSCH repetition transmissions according to the one or more SRS resources configured in the first SRS resource set, and a second PTRS-DMRS association indicated by the second bit is used for the one or more PUSCH repetition transmissions according to the one or more SRS resources configured in the second SRS resource set.

4. The UE of claim 2, wherein the at least one processor is configured to cause the UE to determine that a first PTRS-DMRS association indicated by the first bit is used for one or more PUSCH repetition transmissions according to the one or more SRS resources configured in an SRS resource set according to a first one of the set of PUSCH repetition transmissions being transmitted, and a second PTRS-DMRS association indicated by the second bit is used for other one or more PUSCH repetition transmissions of the set of PUSCH repetition transmissions.

5. The UE of claim 2, wherein the at least one processor is configured to cause the UE to determine that a first PTRS-DMRS association indicated by the first bit is used for one or more PUSCH repetition transmissions according to the one or more SRS resources configured in an SRS resource set indicated by a first SRS resource indicator (SRI) field in the DCI, and a second PTRS-DMRS association indicated by the second bit is used for the one or more PUSCH repetition transmissions according to the one or more SRS resources configured in an SRS resource set indicated by a second SRI field in the DCI.

6. The UE of claim 1, wherein the second indicator indicates that the set of PUSCH repetition transmissions is transmitted according to the one or more SRS resources configured in one SRS resource set of the first SRS resource set and the second SRS resource set.

7. The UE of claim 6, wherein each of the first bit and the second bit corresponds to a respective SRS resource set of the first SRS resource set and the second SRS resource set, and the at least one processor is configured to cause the UE to determine one bit of the first bit and the second bit which corresponds to the one SRS resource set to indicate a PTRS-DMRS association between the one or more PTRS ports and the one or more DMRS ports for each of the set of PUSCH repetition transmissions and ignores the other bit of the first bit and second bit.

8. The UE of claim 6, wherein the at least one processor is configured to cause the UE to determine the first indicator including both the first bit and the second bit to indicate a PTRS-DMRS association between the one or more PTRS ports and the one or more DMRS ports for each of the set of PUSCH repetition transmissions.

9. The UE of claim 1, wherein a first total number of the one or more PTRS ports indicated for one or more PUSCH repetition transmissions according to the one or more SRS resources configured in the first SRS resource set is different from a second total number of the one or more PTRS ports indicated for the one or more PUSCH repetition transmissions according to the one or more SRS resources configured in the second SRS resource set.

10. The UE of claim 9, wherein the at least one processor is configured to cause the UE to:
determine a first PTRS-DMRS association between the one or more PTRS ports and the one or more DMRS ports for one or more PUSCH repetition transmissions according to the one or more SRS resources configured in the first SRS resource set based on at least one of the first bit or the second bit according to a first association table; and
determine a second PTRS-DMRS association between the one or more PTRS ports and the one or more DMRS ports for the one or more PUSCH repetition transmissions according to the one or more SRS resources configured in the second SRS resource set based on at least one of the first bit or the second bit according to a second association table different from the first association table.

11. A base station (BS), comprising:
at least one memory; and
at least one processor coupled with the at least one memory and configured to cause the BS to:
determine a mapping relationship between one or two phase tracking reference signal (PTRS)-demodulation reference signal (DMRS) associations and each physical uplink shared channel (PUSCH) repetition transmission among a set of PUSCH repetition transmissions; and
generate a first indicator and a second indicator, wherein the first indicator includes a first bit and a second bit and indicates the one or two PTRS-DMRS associations between one or more PTRS ports and one or more DMRS ports, and wherein the second indicator indicates whether the set of PUSCH repetition transmissions is transmitted according to one or more sounding reference signal (SRS) resources configured in at least one of a first SRS resource set or a second SRS resource set, and each PUSCH repetition transmission is transmitted according to the one or more SRS resources configured in one of the first SRS resource set or the second SRS resource set; and
transmit downlink control information (DCI) including the first indicator and the second indicator.

12. A method performed by a user equipment (UE), comprising:
receiving downlink control information (DCI) including a first indicator and a second indicator,
wherein the first indicator includes a first bit and a second bit and indicates one or two phase tracking reference signal (PTRS)-demodulation reference signal (DMRS) associations between one or more PTRS ports and one or more DMRS ports, and
wherein the second indicator indicates whether a set of physical uplink shared channel (PUSCH) repetition transmissions is transmitted according to one or more sounding reference signal (SRS) resources configured in at least one of a first SRS resource set or a second SRS resource set, and each PUSCH repetition transmission is transmitted according to the one or more SRS resources configured in one of the first SRS resource set or the second SRS resource set; and
determining a mapping relationship between the one or two PTRS-DMRS association indicated by at least one of the first bit or the second bit of the first indicator and each PUSCH repetition transmission among the set of PUSCH repetition transmissions based on the first indicator and the second indicator.

13. The method of claim 12, wherein the second indicator indicates that the set of PUSCH repetition transmissions is transmitted according to the one or more SRS resources configured in one SRS resource set of the first SRS resource set and the second SRS resource set.

14. The method of claim 13, wherein each of the first bit and the second bit corresponds to a respective SRS resource set of the first SRS resource set and the second SRS resource set, and the method comprises:
determining one bit of the first bit and the second bit which corresponds to the one SRS resource set to indicate a PTRS-DMRS association between the one or more PTRS ports and the one or more DMRS ports for each of the set of PUSCH repetition transmissions and ignoring the other bit of the first bit and second bit.

15. The method of claim 13, further comprising:
determining the first indicator including both the first bit and the second bit to indicate a PTRS-DMRS association between the one or more PTRS ports and the one or more DMRS ports for each of the set of PUSCH repetition transmissions.

16. The method of claim 12, wherein the second indicator indicates that the set of PUSCH repetition transmissions is transmitted according to the one or more SRS resources configured in both the first SRS resource set and the second SRS resource set.

17. The method of claim 16, further comprising:

determining that a first PTRS-DMRS association indicated by the first bit is used for one or more PUSCH repetition transmissions according to the one or more SRS resources configured in the first SRS resource set, and a second PTRS-DMRS association indicated by the second bit is used for the one or more PUSCH repetition transmissions according to the one or more SRS resources configured in the second SRS resource set.

18. The method of claim 16, further comprising:

determining that a first PTRS-DMRS association indicated by the first bit is used for one or more PUSCH repetition transmissions according to the one or more SRS resources configured in an SRS resource set according to a first one of the set of PUSCH repetition transmissions being transmitted, and a second PTRS-DMRS association indicated by the second bit is used for other one or more PUSCH repetition transmissions of the set of PUSCH repetition transmissions.

19. The method of claim 16, further comprising:

determining that a first PTRS-DMRS association indicated by the first bit is used for one or more PUSCH repetition transmissions according to the one or more SRS resources configured in an SRS resource set indicated by a first SRS resource indicator (SRI) field in the DCI, and a second PTRS-DMRS association indicated by the second bit is used for the one or more PUSCH repetition transmissions according to the one or more SRS resources configured in an SRS resource set indicated by a second SRI field in the DCI.

20. A processor for wireless communication, comprising:

at least one controller coupled with at least one memory and configured to cause the processor to:

receive downlink control information (DCI) including a first indicator and a second indicator, wherein the first indicator includes a first bit and a second bit and indicates one or two phase tracking reference signal (PTRS)-demodulation reference signal (DMRS) associations between one or more PTRS ports and one or more DMRS ports, and wherein the second indicator indicates whether a set of physical uplink shared channel (PUSCH) repetition transmissions is transmitted according to one or more sounding reference signal (SRS) resources configured in at least one of a first SRS resource set or a second SRS resource set, and each PUSCH repetition transmission is transmitted according to the one or more SRS resources configured in one of the first SRS resource set or the second SRS resource set; and determine a mapping relationship between the one or two PTRS-DMRS associations indicated by at least one of the first bit or the second bit of the first indicator and each PUSCH repetition transmission among the set of PUSCH repetition transmissions based on the first indicator and the second indicator.

* * * * *